(12) United States Patent
Takenaka

(10) Patent No.: US 9,481,816 B2
(45) Date of Patent: *Nov. 1, 2016

(54) HOT MELT ADHESIVE

(71) Applicant: HENKEL AG & CO. KGAA, Duesseldorf (DE)

(72) Inventor: Makoto Takenaka, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,420

(22) Filed: Oct. 24, 2014

(65) Prior Publication Data

US 2015/0045489 A1 Feb. 12, 2015

Related U.S. Application Data

(63) Continuation of application No. PCT/JP2013/062800, filed on Apr. 25, 2013.

(30) Foreign Application Priority Data

Apr. 26, 2012 (JP) .................................. 2012-101884

(51) Int. Cl.
C09J 167/04 (2006.01)
C09J 123/26 (2006.01)
C09J 167/02 (2006.01)

(52) U.S. Cl.
CPC ............ C09J 167/04 (2013.01); C09J 123/26 (2013.01); C09J 167/02 (2013.01); C09J 2409/00 (2013.01); C09J 2453/00 (2013.01); C09J 2467/00 (2013.01)

(58) Field of Classification Search
CPC .... C09J 167/04; C09J 167/02; C09J 123/26; C08L 53/02; C08L 67/04
USPC ........................................ 524/502, 271, 505
See application file for complete search history.

(56) References Cited

U.S. PATENT DOCUMENTS

| | | | |
|---|---|---|---|
| 3,993,613 A | 11/1976 | Doss et al. | |
| 5,169,889 A | 12/1992 | Kauffman et al. | |
| 5,252,646 A * | 10/1993 | Iovine et al. ................. | 524/270 |
| 5,312,850 A | 5/1994 | Iovine et al. | |
| 5,441,999 A | 8/1995 | Jarvis et al. | |
| 5,518,571 A | 5/1996 | Puerkner et al. | |
| 6,214,476 B1 * | 4/2001 | Ikeda ........................ | B32B 7/12 428/476.9 |
| 2010/0279135 A1 * | 11/2010 | Kitora ...................... | B32B 27/32 428/516 |
| 2010/0330315 A1 | 12/2010 | Robert | |
| 2012/0288658 A1 | 11/2012 | Noak et al. | |
| 2012/0328805 A1 | 12/2012 | Davis | |
| 2013/0108827 A1 * | 5/2013 | Okada ...................... | B32B 7/12 428/121 |

FOREIGN PATENT DOCUMENTS

| | | | | |
|---|---|---|---|---|
| JP | 4255779 A | 9/1992 | | |
| JP | 5-339557 A | 12/1993 | | |
| JP | 6-500350 A | 1/1994 | | |
| JP | 6-145625 A | 5/1994 | | |
| JP | 06145625 A | 5/1994 | | |
| JP | 6-320622 A | 11/1994 | | |
| JP | 6-320623 A | 11/1994 | | |
| JP | 8-41435 A | 2/1996 | | |
| JP | 08041435 A | 2/1996 | | |
| JP | 10-251612 A | 9/1998 | | |
| JP | 10279774 A * | 10/1998 | | |
| JP | 11131037 A | 5/1999 | | |
| JP | 2001-72749 A | 3/2001 | | |
| JP | 2002-58949 A | 2/2002 | | |
| JP | 2002-256250 A | 9/2002 | | |
| JP | 2004-161931 A | 6/2004 | | |
| JP | 2004-256642 A | 9/2004 | | |
| JP | 2005-220244 A | 8/2005 | | |
| JP | 2006-70091 A | 3/2006 | | |
| JP | 2006070091 A | 3/2006 | | |
| JP | 2007-51195 A | 3/2007 | | |
| JP | 2007-262392 A | 10/2007 | | |
| JP | 2010-90185 A | 4/2010 | | |
| JP | 2010-155951 A | 7/2010 | | |
| JP | 2010-280878 A | 12/2010 | | |
| JP | 2012-1624 A | 1/2012 | | |
| JP | 2012233119 A * | 11/2012 | | |
| JP | 2013-227459 A | 11/2013 | | |
| WO | 9410257 A1 | 5/1994 | | |
| WO | 9510577 A1 | 4/1995 | | |
| WO | 2009100414 A1 | 8/2009 | | |
| WO | 2009104372 A1 | 8/2009 | | |
| WO | WO 2009104372 A1 * | 8/2009 | ............ | B32B 27/32 |
| WO | 2010115564 A1 | 10/2010 | | |
| WO | 2011129080 A1 | 10/2011 | | |
| WO | WO 2011129080 A1 * | 10/2011 | .............. | B32B 7/12 |
| WO | 2013162058 A1 | 10/2013 | | |
| WO | 2013162059 A1 | 10/2013 | | |

OTHER PUBLICATIONS

Pang, X et al. Polylactic acid (PLA): Research, development and industrialization. Biotechnol. J. 2010, vol. 5, 1125-1136.

Xu, J. et al. Poly(butylene succinate) and its copolymers: Research, development and industrialization. Biotechnol. J. 2010, 5, 1149-1163.

El-Hadi, Ahmed Mohamed. Development of Novel Biopolymer Blends Based on Poly(L-lactic acid), Poly((R)-3-hydroxybutyrate), and Plasticizer. Polymer Engineering and Science, 2013, Society of Plastic Engineers, Article first published in Jul. 2013. Retrieved from http://onlinelibrary.wiley.com/doi/10.1002/pen.v54.6/issuetoc.

* cited by examiner

*Primary Examiner* — Michael M Bernshteyn
(74) *Attorney, Agent, or Firm* — Sun Hee Lehmann

(57) ABSTRACT

The present invention provides a hot melt adhesive being highly environmentally-friendly, and as well having sufficient pressure-sensitive adhesiveness, adhesion, thermal stability and the like. The present invention relates to a hot melt adhesive comprising (A) a polar functional group-modified polymer, (B) an aliphatic polyester-based resin, (C) a tackifier resin and (D) a thermoplastic elastomer.

6 Claims, No Drawings

HOT MELT ADHESIVE

FIELD OF THE INVENTION

The present invention relates to a hot melt adhesive, and more particularly to a hot melt adhesive used in the field of disposable products typified by disposable diapers and napkins.

BACKGROUND ART OF THE INVENTION

Hot melt adhesives used for disposable products, such as diapers and napkins, are applied to their base materials, for example, nonwoven fabrics, tissues, polyethylene films and the like, and are required to have sufficient adhesion and pressure-sensitive adhesiveness not only at high temperature but also at room temperature.

In recent years, because of an increase in awareness of environmental problems, the replacement of conventional petroleum-derived raw materials by natural materials, plant materials and biodegradable materials has developed. In terms of environmental problems, such as global warming due to an increase of carbon dioxide emission, attempts have been made to produce hot melt adhesives using non-petroleum-based resins, such as polylactic acid-based resins, containing no petroleum as a raw material.

However, in hot melt adhesives containing polylactic acid-based resins, the compatibility between the polylactic acid-based resin and other components, such as a tackifier resin, is insufficient, and therefore the pressure-sensitive adhesiveness, adhesion, thermal stability and the like tend to be poorer than those of hot melt adhesives using no polylactic acid-based resins.

JP 2010-155951 discloses a hot melt adhesive comprising a polylactic acid-based resin and poly(butylene succinate) or poly(ethylene succinate). JP 2004-256642 discloses a hot melt adhesive comprising polylactic acid and a polyvinyl alcohol-based resin. JP 2002-256250 discloses a biodegradable adhesive comprising polylactic acid and a natural powder substance. These adhesives have insufficient pressure-sensitive adhesiveness at room temperature, and do not have sufficient adhesiveness to base materials of polyolefin and the like. In addition, JP 5-339557 discloses a hot melt adhesive composition comprising a thermoplastic resin and a tackifier as main components, wherein either one or both of these components comprise a lactic acid copolymer resin derived from polylactic acid or lactic acid and other hydroxycarboxylic acids. For this hot melt adhesive composition, the compatibility between the tackifier and other components is poor, and therefore this hot melt adhesive composition does not have sufficient adhesion to base materials of polyolefin and the like.

SUMMARY OF THE INVENTION

An object of the present invention is to solve the above problems and to provide a hot melt adhesive being highly environmentally-friendly, and as well having sufficient pressure-sensitive adhesiveness, adhesion, thermal stability and the like, particularly a hot melt adhesive used in the field of disposable products.

The present invention relates to the following items.
1. A hot melt adhesive comprising:
(A) a polar functional group-modified polymer,
(B) an aliphatic polyester-based resin,
(C) a tackifier resin, and
(D) a thermoplastic elastomer.

2. A hot melt adhesive according to the above item 1, wherein the polar functional group-modified polymer (A) comprises at least one polymer selected from a polar functional group-modified conjugated diene-based polymer and a polar functional group-modified polyolefin-based polymer.
3. A hot melt adhesive according to the above item 1 or 2, wherein the polar functional group is at least one functional group selected from an acid anhydride group, a maleic acid group, a carboxyl group, an amino group, an imino group, an alkoxysilyl group, a silanol group, a silyl ether group, a hydroxyl group and an epoxy group.
4. A hot melt adhesive according to any one of the above items 1 to 3, wherein the aliphatic polyester-based resin (B) is at least one selected from a polylactic acid-based resin, a poly(butylene succinate) and a polyhydroxybutyrate.
5. A hot melt adhesive according to any one of the above items 1 to 4, further comprising a plasticizer (E).
6. A disposable product comprising the hot melt adhesive according to any one of the above items 1 to 5.

DETAILED DESCRIPTION OF THE INVENTION

According to the present invention, the addition of a polar functional group-modified polymer in a hot melt adhesive improves the compatibility between an aliphatic polyester-based resin, such as a polylactic acid-based resin, and other components. Thus there is provided a hot melt adhesive being environmentally-friendly, having improved pressure-sensitive adhesiveness, adhesion, thermal stability and the like, and being easily applied to a wide range of types of base materials.

Mode for Carrying Out the Invention

The hot melt adhesive of the present invention comprises at least (A) a polar functional group-modified polymer, (B) an aliphatic polyester-based resin, (C) a tackifier resin and (D) a thermoplastic elastomer. Hereinafter, these may be described below as an "A component," a "B component," a "C component" and a "D component," respectively. A "modified polymer" means to include both (i) one in which a functional group is provided after a polymer is obtained and (ii) one in which a functional group is introduced in the process of polymerization.

<(A) Polar Functional Group-Modified Polymer>

In the hot melt adhesive of the present invention, the use of the polar functional group-modified polymer (A) (A component) increases the compatibility between the aliphatic polyester-based resin (B) and other components, such as the tackifier resin (C), and improves the pressure-sensitive adhesiveness, adhesion, thermal stability and the like.

The polar functional group-modified polymer (A) used in the present invention refers to a polymer having at least one polar functional group. The position at which the polar functional group is introduced is not particularly limited, and may be at an end of the polymer or at inside of the polymer other than the ends of the polymer. The polar functional group may be provided to an obtained polymer, or introduced in the process of polymerizing a monomer.

Examples of the "polar functional group" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group, a maleic acid group, an amino group and an epoxy group are preferred.

The polar functional group-modified polymer (A) is not particularly limited, and preferably comprises at least one selected from a polar functional group-modified conjugated diene-based polymer and a polar functional group-modified polyolefin-based polymer. Two or more of these may be used in combination. These will be described in detail below.

(A-1) Polar Functional Group-Modified Conjugated Diene-Based Polymer

A "conjugated diene-based polymer" refers to a polymer having a structural unit based on a conjugated diene compound (conjugated diene unit).

Here, the "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

In the present invention, the conjugated diene-based polymer may have, in addition to the conjugated diene unit, structural units based on other monomers. Examples of other monomers include vinyl-based aromatic hydrocarbons, vinyl nitrile and unsaturated carboxylate esters.

In the present invention, the "conjugated diene-based polymer" is not particularly limited as long as the hot melt adhesive targeted by the present invention can be obtained. For example, a copolymer in which a vinyl-based aromatic hydrocarbon and a conjugated diene compound are block-copolymerized, that is, one having a vinyl-based aromatic hydrocarbon block and a conjugated diene compound block, is preferred.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

In the present invention, the conjugated diene-based polymer constituting the polar functional group-modified conjugated diene-based polymer contained as the A component may be a non-hydrogenated conjugated diene-based polymer or a hydrogenated conjugated diene-based polymer, and a hydrogenated conjugated diene-based polymer is more preferred.

Examples of the "non-hydrogenated conjugated diene-based polymer" include a styrene-isoprene-styrene block copolymer (also referred to as "SIS") and a styrene-butadiene-styrene block copolymer (also referred to as "SBS"). Examples of the "hydrogenated conjugated diene-based polymer" can include a hydrogenated styrene-isoprene-styrene block copolymer (that is, also referred to as the styrene-ethylene/propylene-styrene block copolymer "SEPS") and a hydrogenated styrene-butadiene-styrene block copolymer (that is, also referred to as the styrene-ethylene/butylene-styrene block copolymer "SEBS"). Among these, SEBS is preferred, and SEBS having a styrene content of 10 to 40% by weight is more preferred for the conjugated diene-based polymer constituting the polar functional group-modified conjugated diene-based polymer contained as the A component.

Examples of the "polar functional group" of the "polar functional group-modified conjugated diene-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic acid group and an amino group are more preferred.

As a method for producing the polar functional group-modified conjugated diene-based polymer, the polar functional group-modified conjugated diene-based polymer may be produced by synthesizing a conjugated diene-based polymer first, and introducing a polar functional group later, or by performing a copolymerization reaction using a monomer containing a polar functional group.

Examples of the "polar functional group-modified conjugated diene-based polymer" include amino group-modified SEBS and maleic acid group-modified SEBS. In a polar functional group-modified conjugated diene-based copolymer, the position at which a polar group, such as an amino group or a maleic acid group, is introduced is not particularly limited. For example, the polar group is preferably introduced into at least one end of the conjugated diene-based copolymer.

As the polar functional group-modified conjugated diene-based copolymer, commercial products may be used. Examples thereof include Tuftec MP10 manufactured by Asahi Kasei Chemicals Corporation, DYNARON 8630P manufactured by JSR and Tuftec M1913 manufactured by Asahi Kasei Chemicals Corporation.

(A-2) Polar Functional Group-Modified Polyolefin-Based Polymer

In the present invention, a "polyolefin-based polymer" means a polymer having a structural unit based on an olefin, and may be an olefin homopolymer or a copolymer obtained by copolymerizing a compound copolymerizable with an olefin. In the present invention, preference is given to a polyolefin-based copolymer containing an olefin in an amount of 50% by weight or more, preferably 60% by weight or more, and containing a compound copolymerizable with an olefin in an amount of less than 50% by weight, preferably less than 40% by weight. Compounds corresponding to the above "polar functional group-modified conjugated diene-based polymer" are not included in the "polar functional group-modified polyolefin-based polymer".

As the olefin, either ethylene or an α-olefin having 3 to 20 carbon atoms are preferred. Examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof. While these may be used alone or in combination of two or more of these, ethylene is preferably contained as the olefin.

In the present invention, the polyolefin-based polymer may contain a structural unit based on a compound copolymerizable with an olefin to the extent that the object of the present invention is not impaired. Examples of the compound copolymerizable with an olefin include unsaturated carboxylic acids or derivatives thereof and vinyl carboxylates, specifically, unsaturated carboxylic acids or derivatives thereof including acrylic acid, methacrylic acid and (meth)acrylates (for example, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, acrylates or methacrylates of polyethylene glycol and polypropylene glycol, trimethoxysilylpropyl acrylate, trimethoxysilylpropyl methacrylate, methyldimethoxysilylpropyl acrylate, methyldimethoxysilylpropyl methacrylate, methyl α-hydroxymethylacrylate, dimethylaminoethyl acrylate and dimethylaminoethyl methacrylate); and vinyl carboxylates including monofunctional aliphatic vinyl carboxylates (for example, vinyl formate, vinyl acetate, vinyl propionate, vinyl butyrate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate and vinyl cyclohexanecarboxylate), aromatic vinyl carboxylates (for example, vinyl benzoate and vinyl cinnamate), and polyfunctional vinyl carboxylates (for example, vinyl monochloroacetate, divinyl adipate, vinyl methacrylate, vinyl crotonate and vinyl sorbate). Among these, methyl acrylate is preferred. These may be used alone or in combination of two or more of these.

Examples of the "polar functional group" of the "polar functional group-modified polyolefin-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group and an epoxy group are more preferred.

As a method for producing the polar functional group-modified polyolefin-based polymer, the polar functional group-modified polyolefin-based polymer may be produced by synthesizing a polyolefin-based polymer, and introducing a polar functional group later, or by performing a copolymerization reaction using a monomer containing a polar functional group. As the monomer containing a polar functional group, for example, glycidyl methacrylate is preferred.

Examples of the "polar functional group-modified polyolefin-based polymer" include an ethylene/methyl acrylate/glycidyl methacrylate copolymerized resin, an ethylene-glycidyl methacrylate-styrene copolymer and a maleic anhydride-modified polyethylene copolymer. In the polar functional group-modified polyolefin-based polymer, the position at which a polar functional group, such as an epoxy group or a maleic anhydride group, is introduced is not particularly limited. The polar functional group may be introduced into an end of the polymer or into the structural unit at inside of the polymer other than the ends of the polymer.

As the polar functional group-modified polyolefin-based resin, commercial products may be used. Examples thereof include BONDFAST 7M (trade name) manufactured by Sumitomo Chemical Co., Ltd., MODIPER A4100 (trade name) manufactured by NOF CORPORATION and Fusabond N525 (trade name) manufactured by DuPont.

In the present invention, the A component preferably comprises a polar functional group-modified polymer having a weight average molecular weight (Mw) of $1.0 \times 10^4$ to $3.0 \times 10^5$, and particularly preferably of $5.0 \times 10^4$ to $2.0 \times 10^5$.

The weight average molecular weight is measured by gel permeation chromatography (GPC) using a calibration curve using monodisperse molecular weight polystyrene as a standard substance to convert molecular weight.

The hot melt adhesive of the present invention preferably comprises a plasticizer (E) (hereinafter sometimes described as an "E component") in addition to the A component, the B component, the C component and the D component. The blending ratio of the A component is preferably 1 to 30 parts by weight, more preferably 2 to 20 parts by weight, based on 100 parts by weight of the total amount of the A to E components.

<(B) Aliphatic Polyester-Based Resin>

In the hot melt adhesive of the present invention, the use of the aliphatic polyester-based resin (B) (B component) is effective to reduce the content of a material made from petroleum and the like, and therefore the environmental load can be reduced.

As the aliphatic polyester-based resin (B), known resins can be used. Examples thereof include polylactic acid-based resins, poly(butylene succinate), poly(butylene succinate-adipate), poly(butylene succinate-terephthalate), poly(ethylene succinate), poly(butylene succinate-carbonate), polyglycolic acid, polycaprolactone, polyhydroxybutyric acid, polyhydroxyvaleric acid and a hydroxybutyric acid-hydroxyvaleric acid copolymer. Among these, polylactic acid-based resins, poly(butylene succinate) and polyhydroxybutyric acid are preferred. These may be used alone or in combinations of two or more.

The above polylactic acid-based resin is a polymer comprising L-lactic acid and/or D-lactic acid as main constituents, and may comprise other copolymerization components other than lactic acid. Examples of such other copolymerization component units include polyvalent carboxylic acids, polyhydric alcohols, hydroxycarboxylic acids and lactones. Specific examples are units produced from polyvalent carboxylic acids, such as oxalic acid, malonic acid, succinic acid, glutaric acid, adipic acid, azelaic acid, sebacic acid, dodecanedionic acid, fumaric acid, cyclohexanedicarboxylic acid, terephthalic acid, isophthalic acid, phthalic acid, 2,6-naphthalenedicarboxylic acid, anthracenedicarboxylic acid, 5-sodium sulfoisophthalic acid and 5-tetrabutylphosphonium sulfoisophthalic acid; polyhydric alcohols, such as ethylene glycol, propylene glycol, butanediol, heptanediol, hexanediol, octanediol, nonanediol, decanediol, 1,4-cyclohexanedimethanol, neopentyl glycol, glycerin, pentaerythritol, aromatic polyhydric alcohols obtained by the addition reaction of bisphenol A or bisphenol with ethylene oxide, diethylene glycol, triethylene glycol, polyethylene glycol, polypropylene glycol and polytetramethylene glycol; hydroxycarboxylic acids, such as glycolic acid, 3-hydroxybutyric acid, 4-hydroxybutyric acid, 4-hydroxyvaleric acid, 6-hydroxycaproic acid and hydroxybenzoic acid; and lactones, such as glycolide, ε-caprolactone glycolide, ε-caprolactone, β-propiolactone, δ-butyrolactone, β- or γ-butyrolactone, pivalolactone and δ-valerolactone, and the like. The content of such other copolymerization units other than lactic acid is generally from 0 to 30 mol % and preferably 0 to 10 mol %, based on 100 mol % of total monomer units.

The blending ratio of the B component is preferably 5 to 70 parts by weight, more preferably 10 to 50 parts by weight, and still more preferably 10 to 40 parts by weight, based on 100 parts by weight of the total amount of the A to E components.

<(C) Tackifier Resin>

In the hot melt adhesive of the present invention, the use of the tackifier resin (C) (C component) improves the pressure-sensitive adhesiveness. The "tackifier resin" is not particularly limited as long as it is generally used in hot melt adhesives and provides the hot melt adhesive targeted by the present invention.

Examples of the tackifier resin can include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. Among these, tackifier resins having an acid value of 0 to 200 mg KOH/g are preferred, and tackifier resins having an acid value of 0 mg KOH/g are more preferred. When the acid value is in these ranges, the pressure-sensitive adhesiveness of the hot melt adhesive of the present invention is improved. These tackifier resins may be used alone or in combination. For the tackifier resin, liquid type tackifier resins can also be used as long as they are colorless to pale yellow in color tone, have substantially no odor, and have good thermal stability. Considering these properties comprehensively, hydrogenated derivatives of resins and the like are preferred as the tackifier resin.

As the tackifier resin, commercial products may be used. Examples of such commercial products include MARUKA-CLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I-MARV S100 (trade name) manufactured by Idemitsu Kosan Co., Ltd., Clearon K4090 (trade name) and Clearon K4100 (trade name) manufactured by YASUHARA CHEMICAL Co., Ltd., ECR5380 (trade name), ECR179EX (trade name), ECR5400 (trade name) and ECR5600 (trade name) manufactured by Exxon Mobil Corporation, Regalite R7100 (trade name) manufactured by Eastman Chemical Company, ECR179X (trade name) manufactured by Exxon, ARKON P100 (trade name) manufactured by Arakawa Chemical Industries, Ltd., 1-marv S110 (trade name) and I-marv Y135 (trade name) manufactured by Idemitsu Kosan Co., Ltd., Easttack C100-R (trade name) manufactured by Easttack and KR-85 (trade name) manufactured by Arakawa Chemical Industries, Ltd. These commercial tackifier resins may be used singly or in combination.

The blending ratio of the C component is preferably 5 to 70 parts by weight, more preferably 10 to 60 parts by weight, based on 100 parts by weight of the total amount of the A to E components.

<(D) Thermoplastic Elastomer>

In the hot melt adhesive of the present invention, the use of the thermoplastic elastomer (D) (D component) further improves the adhesion and pressure-sensitive adhesiveness. The D component is not particularly limited, and is preferably a thermoplastic block copolymer. The thermoplastic block copolymer may be non-hydrogenated or hydrogenated, and is preferably non-hydrogenated. A thermoplastic elastomer having a polar functional group embraced by the above A component is excluded from the D component.

Examples of the "non-hydrogenated thermoplastic block copolymer" include a block copolymer obtained by block-copolymerizing a vinyl-based aromatic hydrocarbon and a conjugated diene compound without subsequently hydrogenating blocks based on the conjugated diene compound in the block copolymer. Examples of the "hydrogenated thermoplastic block copolymer" include a block copolymer obtained by block-copolymerizing a vinyl-based aromatic hydrocarbon and a conjugated diene compound, and then hydrogenating all or a part of blocks based on the conjugated diene compound.

The "conjugated diene compound" means a diolefin compound having at least a pair of conjugated double bonds. Specific examples of the "conjugated diene compound" can include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

Specific examples of the "non-hydrogenated thermoplastic block copolymer" may include a styrene-isoprene-styrene block copolymer (also referred to as "SIS") and a styrene-butadiene-styrene block copolymer (also referred to as "SBS"). Specific examples of the "hydrogenated thermoplastic block copolymer" may include a hydrogenated styrene-isoprene-styrene block copolymer (that is, also referred to as the styrene-ethylene/propylene-styrene block copolymer "SEPS") and a hydrogenated styrene-butadiene-styrene block copolymer (that is, also referred to as the styrene-ethylene/butylene-styrene block copolymer "SEBS").

In the present invention, the thermoplastic elastomer (D) preferably comprises both of SBS and SIS or either one of SBS and SIS. In the hot melt adhesive of the present invention, the use of SBS and/or SIS improves the peel strength.

In the present invention, the thermoplastic elastomer (D) preferably comprises a triblock copolymer having a weight average molecular weight (Mw) of $7.5 \times 10^4$ to $1.0 \times 10^5$. The hot melt adhesive of the present invention with Mw in the above range has excellent coating properties and also excellent peel strength.

In the present invention, as the thermoplastic elastomer (D), commercial products may be used. Examples thereof can include Tufprene T125 (trade name), Tuftec L518X (trade name) and Tuftec H1053 (trade name) manufactured by Asahi Chemical Industry Co., Ltd.; TR2000 (trade name) manufactured by JSR; TAIPOL 4202 (trade name) manufactured by TSRC; Kraton D1162PT (trade name) and G1650M (trade name) manufactured by Kraton Performance Polymers, Inc.; Asaprene T-438 (trade name) manufactured by Asahi Kasei Corporation; Quintac 3460 (trade name), Quintac 3433N (trade name), Quintac 3520 (trade name) and Quintac 3270 (trade name) manufactured by ZEON Corporation and D1160 (trade name) manufactured by Kraton. These commercial products may be used alone or in combination.

The blending ratio of the D component is preferably 1 to 50 parts by weight, more preferably 3 to 40 parts by weight, based on 100 parts by weight of the total amount of the A to E components.

<(E) Plasticizer>

In the present invention, the hot melt adhesive may further comprise the plasticizer (E) (E component). The plasticizer (E) is blended for the purposes of reducing the melt viscosity of the hot melt adhesive, providing flexibility to the hot melt adhesive, and improving the wetting property of the hot melt adhesive on an adherend. The plasticizer (E) is not particularly limited as long as it is compatible with other components, and the hot melt adhesive targeted by the present invention can be obtained.

Examples of the plasticizer include paraffin-based oils, naphthene-based oils and aromatic oils. Particularly, paraffin-based oils and/or naphthene-based oils are preferred, and colorless and odorless paraffin-based oils are most preferred.

Examples of commercial products of plasticizers include White Oil Broom 350 (trade name) manufactured by Kukdong Oil & Chem, Diana Fresia S-32 (trade name), Diana Process Oil PW-90 (trade name) and Daphne Oil KP-68 (trade name) manufactured by Idemitsu Kosan Co., Ltd., Enerper M1930 (trade name) manufactured by BP Chemicals, Kaydol (trade name) manufactured by Crompton, Primol 352 (trade name) manufactured by Exxon and Process Oil NS-100 (trade name) manufactured by Idemitsu Kosan Co., Ltd. These may be used alone or in combinations of two or more.

The blending ratio of the E component is not particularly limited, and is preferably 0 to 40 parts by weight, more preferably 5 to 40 parts by weight, based on 100 parts by weight of the total amount of the A to E components.

The hot melt adhesive according to the present invention may further comprise various additives as required. Examples of such various additives include a stabilizer, a wax and a fine particle filler.

The "stabilizer" is blended to prevent reduction of molecular weight by heating, gelation, coloration, generation of an odor and the like in the hot melt adhesive to improve the stability of the hot melt adhesive. The "stabilizer" is not particularly limited as long as the hot melt adhesive targeted by the present invention can be obtained. Examples of the "stabilizer" include an antioxidant and an ultraviolet absorbing agent.

The "ultraviolet absorbing agent" is used to improve the light resistance of the hot melt adhesive. The "antioxidant" is used to prevent the oxidative degradation of the hot melt adhesive. The antioxidant and the ultraviolet absorbing agent are not particularly limited, and can be used as long as they are generally used in disposable products, and the targeted disposable product described later can be obtained.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMINOX TT (trade name) manufactured by API Corporation and AO-412S (trade name) manufactured by ADEKA CORPORATION. These stabilizers may be used alone or in combination.

The "wax" is not particularly limited as long as it is a wax generally used in hot melt adhesives and provides the hot melt adhesive targeted by the present invention. Specific examples thereof include synthetic waxes, such as Fischer-Tropsch waxes and polyolefin waxes (polyethylene waxes and polypropylene waxes); petroleum waxes, such as paraffin waxes and microcrystalline waxes; and natural waxes, such as castor waxes.

The hot melt adhesive of the present invention may further comprise a fine particle filler. The fine particle filler may be a generally used one, and is not particularly limited as long as the hot melt adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt adhesive according to the present invention may be produced by blending the A component, the B component, the C component and the D component and preferably the E component and further various additives as required, using a generally known method for producing a hot melt adhesive. For example, the hot melt adhesive according to the present invention may be produced by blending predetermined amounts of the above-described components, and heating and melting them. The order of adding the components, the heating method and the like are not particularly limited as long as the targeted hot melt adhesive is obtained.

As a further preferred mode of the present invention, the hot melt adhesive preferably has a viscosity (or melt viscosity) at 140° C. of 20000 mPa·s or less, particularly preferably less than 9000 mPa·s. The viscosity allowing application of uniform coating with the hot melt adhesive is 20000 mPa·s or less, and the viscosity allowing easy application of uniform coating is less than 9000 mPa·s. With the viscosity at 140° C. in the above range, the hot melt adhesive is much more suitable for coating. The viscosity (or melt viscosity) at 140° C. herein means a value measured by a Brookfield viscometer using a No. 27 spindle.

The hot melt adhesive according to the present invention is widely utilized for paper processing, bookbinding, disposable products and the like, and is particularly effectively utilized for disposable products because of excellent adhesion in a wet state. The "disposable products" are not particularly limited as long as they are the so-called sanitary materials. Specific examples thereof include disposable diapers, sanitary napkins, pet sheets, hospital gowns, operation white coats, urine liners, puerperant shorts, breast milk pads and armpit sweat pads.

In another aspect of the present invention, there is provided a disposable product obtained by applying the above-described hot melt adhesive. The disposable product can be formed by applying the hot melt adhesive according to the present invention to at least one member selected from the group consisting of a woven fabric, a nonwoven fabric, a rubber, a resin, paper and a polyolefin film. The polyolefin film is preferably a polyethylene film for reasons of durability, cost and the like. When the hot melt adhesive of the present invention is used, the adhesiveness between nonwoven fabrics or between a nonwoven fabric and a polyolefin film is excellent, and therefore, use in disposable diapers is particularly preferred.

In production lines for disposable products, generally the hot melt adhesive is applied to various members (for example, tissues, cotton, nonwoven fabrics, polyolefin films and release paper) of the disposable products. For such application, the hot melt adhesive may be used by ejecting it from various ejection machines (dispensers).

The method for applying the hot melt adhesive is not particularly limited as long as the targeted disposable product can be obtained. Such application methods may be broadly divided into contact application and noncontact application. The "contact application" refers to an application method in which an ejection machine is brought into contact with a member or a film when the hot melt adhesive is applied. The "noncontact application" refers to an application method in which an ejection machine is not brought into contact with a member or a film when the hot melt adhesive is applied. Examples of the contact application method include slot coater coating and roll coater coating. Examples of the noncontact application method can include spiral coating which allows coatings in the form of a spiral, omega coating and control seam coating which allows coatings in the form of a wave, slot spray coating and curtain spray coating which allows coatings in the form of a plane, and dot coating which allows coatings in the form of dots.

EXAMPLES

For the purpose of describing the present invention in more details and more specifically, the present invention will be described below using Examples. These Examples are for illustrating the present invention, and are not intended to limit the present invention in any way.

Components blended in hot melt adhesives are shown below.

(A) Polar Functional Group-Modified Polymers
 (A-1) polar functional group-modified conjugated diene-based copolymers
  (A-1-1) amino group-modified SEBS ("Tuftec MP10" manufactured by Asahi Kasei Chemicals Corporation)
  (A-1-2) amino group-modified SEBS ("DYNARON 8630P" manufactured by JSR)
  (A-1-3) maleic acid group-modified SEBS ("Tuftec M1913" manufactured by Asahi Kasei Chemicals Corporation)
 (A-2) polar functional group-modified polyolefin-based polymers
  (A-2-1) an ethylene/methyl acrylate/glycidyl methacrylate copolymerized resin ("BONDFAST 7M" (trade name) manufactured by Sumitomo Chemical Co., Ltd.)
  (A-2-2) an ethylene-glycidyl methacrylate-styrene copolymer ("MODIPER A4100" (trade name) manufactured by NOF CORPORATION)
  (A-2-3) a maleic anhydride-modified polyethylene copolymer ("Fusabond N525" (trade name) manufactured by DuPont)
(B) Aliphatic Polyester-Based Resins
 (B-1) polylactic acid-based resins
  (B-1-1) a poly L-lactic acid resin ("4032" (trade name) manufactured by NatureWorks LLC)
  (B-1-2) a poly LD-lactic acid resin ("4060D" (trade name) manufactured by NatureWorks LLC)
 (B-2) a poly(butylene succinate) resin ("AD92W" (trade name) manufactured by Mitsubishi Chemical Corporation)
 (B-3) a polyhydroxybutyrate-based resin ("PHB" (trade name) manufactured by Aldrich
(C) Tackifier Resins
 (C-1) a hydrogenated derivative of an aromatic petroleum hydrocarbon resin ("ECR179X" (trade name) manufactured by Exxon, acid value 0 mg KOH/g)
 (C-2) a C9-based petroleum resin ("ARKON P100" (trade name) manufactured by Arakawa Chemical Industries, Ltd., acid value 0 mg KOH/g)
 (C-3) a hydrogenated petroleum resin ("I-marv 5110" (trade name) manufactured by Idemitsu Kosan Co., Ltd., acid value 0 mg KOH/g)
 (C-4) a C5-based petroleum resin ("Easttack C100-R" (trade name) manufactured by Easttack, acid value 0 mg KOH/g)
 (C-5) a rosin-based resin (KR-85 (trade name) manufactured by Arakawa Chemical Industries, Ltd., acid value 165 to 175 mg KOH/g)
 (C-6) a hydrogenated petroleum resin (1-marv Y135 (trade name) manufactured by Idemitsu Kosan Co., Ltd., acid value 0 mg KOH/g)
(D) Thermoplastic Elastomers
 (D-1) an SBS triblock copolymer (Asaprene T-438 (trade name) manufactured by Asahi Kasei Corporation)
 (D-2) an SIS triblock copolymer (Quintac 3460 (trade name) manufactured by ZEON Corporation)
 (D-3) an SIS triblock copolymer (Quintac 3433N (trade name) manufactured by ZEON Corporation)
 (D-4) an SIS triblock copolymer (Quintac 3520 (trade name) manufactured by ZEON Corporation)
 (D-5) an SIS triblock copolymer (Quintac 3270 (trade name) manufactured by ZEON Corporation)
 (D-6) an SIS triblock copolymer (D1160 (trade name) manufactured by Kraton)
(E) Plasticizers
 (E-1) a paraffin-based oil (Diana Fresia S-32 (trade name) manufactured by Idemitsu Kosan Co., Ltd.)
 (E-2) a naphthene-based oil (NS-100 (trade name) manufactured by Idemitsu Kosan Co., Ltd.)
(F) Antioxidants
 (F-1) a sulfur-based antioxidant (AO-412S (trade name) manufactured by ADEKA CORPORATION)
 (F-2) a phenol-based antioxidant (SUMILIZER GM (trade name) manufactured by Sumitomo Chemical Co., Ltd.)

The (A) to (F) components were blended in blending proportions shown in Table 1 to Table 4, and melted and mixed at about 145° C. over about 3 hours using a universal stirrer to produce the hot melt adhesives of Examples 1 to 25 and Comparative Examples 1 to 11. The numerical values regarding the composition (blend) of the hot melt adhesives shown in Tables 1 to 4 are all parts by weight.

For the hot melt adhesives of the Examples and the Comparative Examples, loop tack, thermal stability, T-peel strength, melt viscosity and a nonwoven fabric/PE film peel strength test were evaluated. The outline of each evaluation will be described below.

<Loop Tack>

The hot melt adhesive was applied to a PET film having a thickness of 50 μm so as to have a thickness of 50 μm. The PET film with the hot melt adhesive was formed into a size of 2.5 cm×12.5 cm to provide a specimen. This specimen was wound in a loop shape so that the tacky surface (adhesive-applied surface) was on the outside, and the specimen was brought into contact with a PE plate at a speed of 300 mm/min at 20° C. Then, the peak value of peeling strength when the specimen was peeled from the PE plate at a speed of 300 mm/min was measured. The results are shown in Tables 1 to 3. The evaluation criteria are as follows.

⊚: peel strength 1,000 g/25 mm or more
 ○: peel strength greater than 500 g/25 mm but less than 1,000 g/25 mm
 Δ: peel strength greater than 300 g/25 mm but up to an including 500 (g/25 mm)
 x: peel strength 300 g/25 mm or less <Thermal Stability>

The thermal stability was determined by a change in appearance after 35 g of the hot melt adhesive was placed in a 70 mL glass bottle and allowed to stand in a dryer oven at 150° C. for 24 hours. The results are shown in Tables 1 to 3. The evaluation criteria are as follows.

∘∘: Phase separation, carbonized product or ring (a degraded product of the hot melt adhesive deposited in a ring shape) was not observed.

∘: Phase separation, carbonized product and a ring were very slightly observed.

Δ: Phase separation, carbonized product and a ring were slightly observed.

x: Phase separation, carbonized product and a ring were observed.

<T-Peel Strength>

The hot melt adhesive was applied to a PET film having a thickness of 50 μm so as to have a thickness of 50 μm. The PET film with the hot melt adhesive was formed to a width of 2.5 cm to provide a specimen. A polyethylene film was bonded to the specimen at a speed of 300 mm/min in a 20° C. atmosphere using a 2 kg roller, followed by aging at room temperature for 24 hours. Then, the peeling strength was measured by performing peeling at a speed of 300 mm/min in a 20° C. atmosphere. For each hot melt adhesive, the peel strength was represented by the average value obtained from the measurement of three samples. The results are shown in Tables 1 to 3. The evaluation criteria are as follows.

∘∘: peel strength 1,500 g/25 mm or more

∘: peel strength greater than 800 g/25 mm but less than 1,500 g/25 mm

Δ: peel strength greater than 300 g/25 mm up to and including 800 g/25 mm x: peel strength 300 g/25 mm or less <Melt Viscosity>

For the melt viscosity, the hot melt adhesive was heated and melted, and the viscosity in a molten state was measured at 140° C. and 160° C. using a Brookfield RVT type viscometer (spindle No. 27). The results are shown in Table 4. The evaluation criteria are as follows.

∘∘: the melt viscosity at 140° C. is less than 9000 mPa·s

∘: the melt viscosity at 140° C. is from 9000 mPa·s to 20000 mPa·s x: the melt viscosity at 140° C. is more than 20000 mPa·s <Nonwoven Fabric/PE Film Peel Strength Test>

A nonwoven fabric was coated with the hot melt adhesive in an amount of application of 5 g/m2 at a temperature of 150° C. by spiral spray, and the hot melt adhesive-coated nonwoven fabric and a PE film were superimposed via the hot melt adhesive, and pressed at a pressure of 0.5 kgf/cm to obtain a sample (nonwoven fabric/PE film). The obtained sample was cut to 25 mm in the direction perpendicular to the travel of the substrate (CD direction), and the peeling strength was measured by performing peeling at a speed of 300 mm/min was measured. For each hot melt adhesive, the peel strength was represented by the average value obtained from the measurement of three samples. The results are shown in Table 4. The evaluation criteria are as follows.

∘∘: peel strength more than 80 g/25 mm

∘: peel strength 40 g/25 mm or more but 80 g/25 mm or less

Δ: peel strength greater than 20 g/25 mm but less than 40 g/25 mm x: peel strength 20 g/25 mm or less

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| (A-1-1) | 5 | 5 | 5 | | | | | | 6 | 6 |
| (A-1-2) | | | | 6 | | | | | | |
| (A-1-3) | | | | | 12 | | | | | |
| (A-2-1) | | | | | | 7 | | | | |
| (A-2-2) | | | | | | | 10 | | | |
| (A-2-3) | | | | | | | | 6 | | |
| (B-1-1) | | | | | | | | | 25 | |
| (B-1-2) | 40 | 40 | 35 | 25 | 25 | 25 | 25 | 25 | | 25 |
| (B-2) | | | | | | | | | | |
| (B-3) | | | | | | | | | | |
| (C-1) | 36 | | 36 | 10 | 20 | 20 | 6 | 10 | 10 | 10 |
| (C-2) | | | | | 19 | 20 | | | | |
| (C-3) | | 18 | | 30 | | | 30 | 30 | 30 | 30 |
| (C-4) | | 18 | | | | | | | | |
| (C-5) | | | | | | | | | | |
| (C-6) | | | | | | | | | | |
| (D-1) | | | 5 | | | 4 | | | | |
| (D-2) | 5 | 5 | | 10 | 10 | 10 | 10 | 10 | 10 | |
| (D-3) | | | | | | | | | | 10 |
| (D-4) | | | | | | | | | | |
| (D-5) | | | | | | | | | | |
| (D-6) | | | | | | | | | | |
| (E-1) | 14 | 14 | 19 | 19 | 14 | 14 | 19 | 19 | 19 | 19 |
| (E-2) | | | | | | | | | | |
| (F-1) | 0.2 | 0.2 | 0.2 | 0.2 | 0.2 | 0.2 | 0.2 | 0.2 | 0.2 | 0.2 |
| (F-2) | 0.3 | 0.3 | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 | 100.5 | 100.5 |
| Loop tack PE PLATE | | | | | | | | | | |
| (g/25 mm) | 900 | 1,000 | 900 | 800 | 750 | 1,000 | 1,200 | 1,200 | 1,000 | 1,000 |
| Evaluation | ∘ | ∘∘ | ∘ | ∘ | ∘ | ∘∘ | ∘∘ | ∘∘ | ∘∘ | ∘∘ |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Thermal stability 150° C. × 1 day | ○○ | ○○ | ○○ | ○ | ○ | ○○ | ○ | ○ | ○○ | ○○ |
| T-peel adhesive strength PE/PET | | | | | | | | | | |
| (g/25 mm) | 1800 | 1600 | 1300 | 1300 | 1000 | 2000 | 1500 | 1500 | 2000 | 2000 |
| Evaluation | ○○ | ○○ | ○ | ○ | ○ | ○○ | ○○ | ○○ | ○○ | ○○ |

Ex. = Example

TABLE 2

|  | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| (A-1-1) | 6 | 6 | 6 | 6 | 6 | 6 | 6 | 6 | 5 |
| (A-1-2) | | | | | | | | | |
| (A-1-3) | | | | | | | | | |
| (A-2-1) | | | | | | | | | |
| (A-2-2) | | | | | | | | | |
| (A-2-3) | | | | | | | | | |
| (B-1-1) | | | | | | | | | |
| (B-1-2) | 25 | 25 | | | 25 | 25 | 25 | 25 | 35 |
| (B-2) | | | 25 | | | | | | |
| (B-3) | | | | 25 | | | | | |
| (C-1) | 10 | 10 | 10 | 10 | | 9 | | | |
| (C-2) | | | | | | | | | |
| (C-3) | 30 | 30 | 30 | 30 | 38 | 29 | 38 | 19 | |
| (C-4) | | | | | | | | | |
| (C-5) | | | | | | | | | 30 |
| (C-6) | | | | | | | | 19 | |
| (D-1) | | | | | | | | | |
| (D-2) | | | | | | 3 | 8 | 6 | 5 |
| (D-3) | | | | | | 5 | | | |
| (D-4) | 10 | | | | | | | | |
| (D-5) | | 10 | 10 | 10 | | | | | |
| (D-6) | | | | | 8 | | | | |
| (E-1) | 19 | 19 | 19 | 19 | | 19 | | | |
| (E-2) | | | | | 23 | 4 | 23 | 25 | 25 |
| (F-1) | 0.2 | 0.2 | 0.2 | 0.2 | 0.2 | 0.2 | 0.2 | 0.2 | 0.2 |
| (F-2) | 0.3 | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 | 100.5 |
| Loop tack PE PLATE | | | | | | | | | |
| (g/25 mm) | 1,200 | 1,300 | 1,600 | 1,600 | 1,300 | 1,100 | 1,400 | 1,300 | 1,000 |
| Evaluation | ○○ | ○○ | ○○ | ○○ | ○○ | ○○ | ○○ | ○○ | ○○ |
| Thermal stability 150° C. × 1 day | ○○ | ○○ | ○○ | ○ | ○○ | ○○ | ○○ | ○○ | ○○ |
| T-peel adhesive strength PE/PET | | | | | | | | | |
| (g/25 mm) | 1800 | 1900 | 1,500 | 850 | 2200 | 1600 | 2200 | 2,000 | 950 |
| Evaluation | ○○ | ○○ | ○○ | ○ | ○○ | ○○ | ○○ | ○○ | ○ |

Ex. = Example

TABLE 3

|  | Com-Ex. 1 | Com-Ex. 2 | Com-Ex. 3 | Com-Ex. 4 | Com-Ex. 5 | Com-Ex. 6 | Com-Ex. 7 | Com-Ex. 8 | Com-Ex. 9 |
|---|---|---|---|---|---|---|---|---|---|
| (A-1-1) | | 45 | 25 | | 20 | | | | |
| (A-1-2) | | | | | | | | | |
| (A-1-3) | | | | | | | | | |
| (A-2-1) | | | | | | | | | |
| (A-2-2) | | | | | | | | | |
| (A-2-3) | | | | | | | 20 | | |

TABLE 3-continued

|  | Com-Ex. 1 | Com-Ex. 2 | Com-Ex. 3 | Com-Ex. 4 | Com-Ex. 5 | Com-Ex. 6 | Com-Ex. 7 | Com-Ex. 8 | Com-Ex. 9 |
|---|---|---|---|---|---|---|---|---|---|
| (B-1-1) |  |  |  |  |  |  |  |  |  |
| (B-1-2) | 45 |  |  | 40 | 40 | 40 | 40 | 25 | 25 |
| (B-2) |  |  |  |  |  |  |  |  |  |
| (B-3) |  |  |  |  |  |  |  |  |  |
| (C-1) |  |  |  |  |  | 36 |  | 40 | 40 |
| (C-2) |  |  |  |  |  |  |  |  |  |
| (C-3) | 36 | 36 | 36 | 21 |  |  | 36 |  |  |
| (C-4) |  |  |  |  |  |  |  |  |  |
| (C-5) |  |  |  |  |  |  |  |  |  |
| (C-6) |  |  |  |  |  |  |  |  |  |
| (D-1) |  |  |  | 20 |  | 21 |  |  |  |
| (D-2) |  |  |  |  |  |  |  |  |  |
| (D-3) |  |  |  |  |  | 10 | 10 | 16 | 16 |
| (D-4) |  |  |  |  |  |  |  |  |  |
| (D-5) |  |  |  |  |  |  |  |  |  |
| (D-6) |  |  |  |  |  |  |  |  |  |
| (E-1) | 19 | 19 | 19 | 19 | 19 | 14 | 14 | 19 |  |
| (E-2) |  |  |  |  |  |  |  |  | 19 |
| (F-1) | 0.2 | 0.2 | 0.2 | 0.2 | 0.2 | 0.2 | 0.2 | 0.2 | 0.2 |
| (F-2) | 0.3 | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 | 100.5 |
| Loop tack PE PLATE |  |  |  |  |  |  |  |  |  |
| (g/25 mm) | 0 | 150 | 450 | 0 | 0 | 0 | 0 | 0 | 0 |
| Evaluation | x | x | Δ | x | x | x | x | x | x |
| Thermal stability 150° C. × 1 day | x | x | Δ | o | Δ | x | x | x | x |
| T-peel adhesive strength PE/PET |  |  |  |  |  |  |  |  |  |
| (g/25 mm) | 0 | 0 | 0 | 0 | 0 | 0 | 0 | 0 | 0 |
| Evaluation | x | x | x | x | x | x | x | x | x |

Com-Ex. = Comparative Example

As shown in Table 1 and Table 2, in the hot melt adhesives of Examples 1 to 19 which contain all of the A component, the B component, the C component and the D component, all of loop tack, thermal stability and the T-peel strength between the PE film and the PET film were good.

As shown in Table 3, in Comparative Examples 1 to 9 which do not contain any one or two components of the A component, the B component, the C component and the D component, most of loop tack, thermal stability and the T-peel strength between the PE film and the PET film were low. In Comparative Examples 6 to 9 which do not comprise the polar functional group-modified polymer of the (A) component and comprise the (B) component, the (C) component and the (D) component, these components were not compatible with each other and separated, and the physical properties as a hot melt adhesive were poor.

TABLE 4

|  | Ex. 20 | Ex. 21 | Ex. 22 | Ex. 23 | Ex. 24 | Ex. 25 | Com-Ex. 10 | Com-Ex. 11 |
|---|---|---|---|---|---|---|---|---|
| (A-1-1) | 5 | 5 | 6 | 6 | 6 | 6 |  |  |
| (A-1-2) |  |  |  |  |  |  |  |  |
| (A-2-1) |  |  |  |  |  |  |  |  |
| (B-1) |  |  |  |  |  |  |  |  |
| (B-2) | 40 | 25 | 25 | 25 | 25 | 25 | 45 | 25 |
| (B-3) |  |  |  |  |  |  |  |  |
| (C-1) | 36 | 20 | 10 | 10 | 10 | 10 | 36 | 10 |
| (C-2) |  | 20 |  |  |  |  |  |  |
| (C-3) |  |  | 30 | 30 | 30 | 30 |  | 30 |
| (D-1) | 5 | 4 |  |  |  |  |  |  |
| (D-2) |  |  |  |  | 6 | 10 | 16 |  |
| (D-3) |  |  | 4 | 6 |  |  |  |  |
| (D-4) |  | 10 | 6 | 4 |  |  |  |  |
| (D-5) |  |  |  |  | 4 |  |  |  |
| (E-1) | 14 | 16 | 19 | 19 | 19 | 19 | 19 | 19 |
| (F-1) | 0.2 | 0.2 | 0.2 | 0.2 | 0.2 | 0.2 | 0.2 | 0.2 |
| (F-2) | 0.3 | 0.3 | 0.3 | 0.3 | 0.3 | 0.3 | 0.3 | 0.3 |
| Total (parts by weight) | 100.5 | 100.5 | 100.5 | 100.5 | 100.5 | 100.5 | 100.5 | 100.5 |
| Viscosity (mPas) |  |  |  |  |  |  |  |  |
| 140° C. | 6100 | 10000 | 7400 | 10037 | 7025 | 8625 | — | — |
| 160° C. | 2900 | 4400 | 3400 | 4610 | 3270 | 3820 | — | — |

TABLE 4-continued

|  | Ex. 20 | Ex. 21 | Ex. 22 | Ex. 23 | Ex. 24 | Ex. 25 | Com-Ex. 10 | Com-Ex. 11 |
|---|---|---|---|---|---|---|---|---|
| Evaluation T-peel adhesive strength nonwoven fabric/PE | ○○ | ○ | ○○ | ○ | ○○ | ○○ | x | x |
| (g/25 mm) | 40 | 113 | 120 | 137 | 138 | 155 | 0 | 0 |
| Evaluation | ○ | ○○ | ○○ | ○○ | ○○ | ○○ | x | x |

"Ex." = Example
"Com-Ex." = Comparative Example
"—" = Unable to measure

As shown in Table 4, in Examples 20 to 25 which contain all of the A component, the B component, the C component and the D component, the viscosity was not problematic for coating with the hot melt adhesive, and the T-peel adhesive strength between the nonwoven fabric and the PE film was also high and good. On the other hand, in Comparative Example 10 which does not comprise the A component or the D component and in Comparative Example 11 which does not comprise the A component, phase separation occurred, viscosity measurement was impossible, and application to the nonwoven fabric could not be performed for both compositions.

INDUSTRIAL APPLICABILITY

The present invention can provide a hot melt adhesive and an absorbent article coated with the hot melt adhesive. The absorbent article according to the present invention is particularly effective as a disposable diaper in which a nonwoven fabric is adhered to a polyolefin film.

The invention claimed is:

1. A hot melt adhesive comprising:
    (A) a polar functional group-modified polymer selected from a polar functional group-modified conjugated diene-based polymer,
    (B) an aliphatic polyester-based resin,
    (C) a tackifier resin, and
    (D) a thermoplastic elastomer, wherein the aliphatic polyester-based resin (B) comprises at least one selected from a polylactic acid-based resin, a poly(butylene succinate) and a polyhydroxybutyrate.

2. The hot melt adhesive according to claim 1, wherein the polar functional group is at least one functional group selected from an acid anhydride group, a maleic acid group, a carboxyl group, an amino group, an imino group, an alkoxysilyl group, a silanol group, a silyl ether group, a hydroxyl group, an epoxy group and mixture thereof.

3. The hot melt adhesive according to claim 1 further comprising a plasticizer (E).

4. An article comprising the hot melt adhesive of claim 1.

5. The article of claim 4, which is a disposable product.

6. The hot melt adhesive according to claim 1 wherein the polar functional group-modified conjugated diene-based polymer has a vinyl-based aromatic hydrocarbon block and a conjugated diene compound block.

* * * * *